US011460922B2

(12) United States Patent
Kim et al.

(10) Patent No.: US 11,460,922 B2
(45) Date of Patent: Oct. 4, 2022

(54) DISPLAY APPARATUS

(71) Applicant: LG Display Co., Ltd., Seoul (KR)

(72) Inventors: Seeun Kim, Paju-si (KR); Taehyung Kim, Paju-si (KR); HakMo Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/580,371

(22) Filed: Sep. 24, 2019

(65) Prior Publication Data

US 2020/0117273 A1   Apr. 16, 2020

(30) Foreign Application Priority Data

Oct. 15, 2018 (KR) .................. 10-2018-0122805

(51) Int. Cl.
*G06F 3/01* (2006.01)
*G06F 3/041* (2006.01)
*G06F 3/14* (2006.01)

(52) U.S. Cl.
CPC ............ *G06F 3/016* (2013.01); *G06F 3/0412* (2013.01); *G06F 3/1446* (2013.01); *G06F 2203/04112* (2013.01)

(58) Field of Classification Search
CPC .............. G06F 1/1601; G06F 1/1605; G06F 2203/04112; G06F 3/016; G06F 3/0412; G06F 3/1446; H04N 5/60; H04N 5/642; H04R 1/025; H04R 1/2803; H04R 2499/15; H04R 7/04
See application file for complete search history.

(56) References Cited

U.S. PATENT DOCUMENTS

| 5,221,243 A | 6/1993 | Walker |
| 2012/0229885 A1 | 9/2012 | Chen et al. |
| 2013/0271389 A1* | 10/2013 | Lyons .................... G06F 1/1641 345/173 |
| 2014/0241558 A1* | 8/2014 | Yliaho ..................... H04R 5/02 381/333 |
| 2014/0285400 A1* | 9/2014 | Sato ....................... G06F 3/1446 345/1.3 |

(Continued)

FOREIGN PATENT DOCUMENTS

| CN | 101738814 A | 6/2010 |
| CN | 103176304 A | 6/2013 |
| CN | 203165456 U | 8/2013 |

(Continued)

OTHER PUBLICATIONS

First Notification of Office Action dated Oct. 14, 2020, issued in corresponding Chinese Patent Application No. 201910924823.6.

(Continued)

*Primary Examiner* — Robin J Mishler
(74) *Attorney, Agent, or Firm* — Morgan, Lewis & Bockius LLP

(57) ABSTRACT

A display apparatus includes a display panel including a plurality of display surfaces having a closed-loop structure and configured to display images in different directions, a plurality of vibration generating devices configured to vibrate the plurality of display surfaces, and a vibration support surrounded by the plurality of display surfaces and configured to support the plurality of vibration generating devices.

20 Claims, 11 Drawing Sheets

(56) References Cited

U.S. PATENT DOCUMENTS

2017/0289694 A1* 10/2017 Choi ...................... H04R 7/045
2019/0037164 A1* 1/2019 Kim ...................... H04N 5/642

FOREIGN PATENT DOCUMENTS

| CN | 104077095 A | 10/2014 |
| CN | 104487908 A | 4/2015 |
| CN | 107295446 A | 10/2017 |
| CN | 206921386 U | 1/2018 |

OTHER PUBLICATIONS

Office Action dated Apr. 1, 2021, issued in corresponding Chinese Patent Application No. 201910924823.6.

* cited by examiner

DISPLAY APPARATUS

CROSS-REFERENCE TO RELATED APPLICATIONS

This application claims the benefit of priority to Korean Patent Application No. 10-2018-0122805, filed on Oct. 15, 2018, the entirety of which is hereby incorporated by reference.

BACKGROUND

Technical Field

The present disclosure relates to a display apparatus.

Discussion of the Related Art

Recently, as information-oriented society advances, the field of display apparatuses for visually displaying an electrical information signal has rapidly advanced. Various display apparatuses having excellent performance, such as thinness, lightness, and low power consumption, are being developed. Examples of such display apparatuses include liquid crystal display (LCD) apparatuses, field emission display (FED) apparatuses, organic light emitting display apparatuses, etc.

Generally, display apparatuses display an image on a display panel, but a separate speaker may be installed for providing a sound. When a speaker is installed in a display apparatus, a traveling direction of a sound output through the speaker may be a direction toward a side portion or an upper/lower portion of the display panel, instead of toward a front surface or a rear surface of the display panel. Thus, the sound does not travel in a direction toward a viewer who is viewing an image in front of the display panel, and an immersion experience of the viewer is hindered.

Moreover, when a speaker is included in a set apparatus such as television (TV), the speaker occupies a certain space. Thus, the design and space disposition of the set apparatus are limited.

SUMMARY

Accordingly, embodiments of the present disclosure are directed to a display apparatus that substantially obviates one or more of issues due to limitations and disadvantages of the related art.

Therefore, the inventors have recognized the above-described problems and have made various experiments so that, when viewing an image in front of a display panel, a traveling direction of a sound becomes a direction toward a front surface of the display panel, and thus, sound quality is enhanced. Through the various experiments, the inventors have implemented a display apparatus having a new structure that may output a sound having a traveling direction that is a direction toward a front surface of a display panel, thereby enhancing sound quality.

An aspect of the present disclosure is to provide a display apparatus in which a vibration support supporting a plurality of vibration generating devices respectively vibrating a plurality of display surfaces of a display panel is provided as one body, and thus, a sound output characteristic is increased and/or maximized.

Another aspect of the present disclosure is to provide a display apparatus in which heat occurring in a plurality of vibration generating devices is dissipated through an integrated vibration support, and thus, heat dissipation performance is enhanced.

Another aspect of the present disclosure is to provide a display apparatus in which spaces respectively corresponding to a plurality of display surfaces of a display panel are separated from one another, and thus, interference between sounds generated by a plurality of vibration generating devices is reduced and/or minimized.

Another aspect of the present disclosure is to provide a display apparatus which includes a sound absorption member disposed in each of spaces respectively vibrating a plurality of display surfaces of a display panel, thereby controlling a sound pressure level of a specific frequency domain.

Additional features and aspects will be set forth in the description that follows, and in part will be apparent from description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other aspects of the inventive concepts as embodied and broadly described, there is provided a display apparatus, including: a display panel including a plurality of display surfaces having a closed-loop structure and configured to display images in different directions; a plurality of vibration generating devices configured to vibrate the plurality of display surfaces; and a vibration support surrounded by the plurality of display surfaces and configured to support the plurality of vibration generating devices.

In another aspect, there is provided a display apparatus, including: a display panel including a plurality of display surfaces configured to display images in different directions; a separation part configured to separate spaces respectively corresponding to the plurality of display surfaces; a plurality of vibration generating devices respectively configured to vibrate the plurality of display surfaces; and a plurality of vibration supports respectively between each of the plurality of vibration generating devices and the separation part and configured to support each of the plurality of vibration generating devices.

A display apparatus according to the present disclosure may output a sound to a region in front of the display panel. Accordingly, a position of an image displayed by the display apparatus may match a position of a sound generated by the display apparatus, thereby enhancing an immersion experience of a viewer who is viewing the image displayed by the display apparatus.

Moreover, in the display apparatus according to the present disclosure, the vibration support supporting the plurality of vibration generating devices respectively vibrating a plurality of display surfaces of the display panel may be provided as one body, and thus, a sound output characteristic may be increased and/or maximized.

Moreover, in the display apparatus according to the present disclosure, heat occurring in the plurality of vibration generating devices may be dissipated through the integrated vibration support, and thus, heat dissipation performance may be enhanced.

Moreover, in the display apparatus according to the present disclosure, spaces respectively corresponding to the plurality of display surfaces of the display panel may be separated from one another, and thus, interference between sounds generated by the plurality of vibration generating devices may be reduced and/or minimized.

Moreover, the display apparatus according to the present disclosure may include a sound absorption member disposed in each of spaces respectively vibrating the plurality of display surfaces of the display panel, thereby controlling a sound pressure level of a specific frequency domain.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

DETAILED DESCRIPTION

Figure 1:
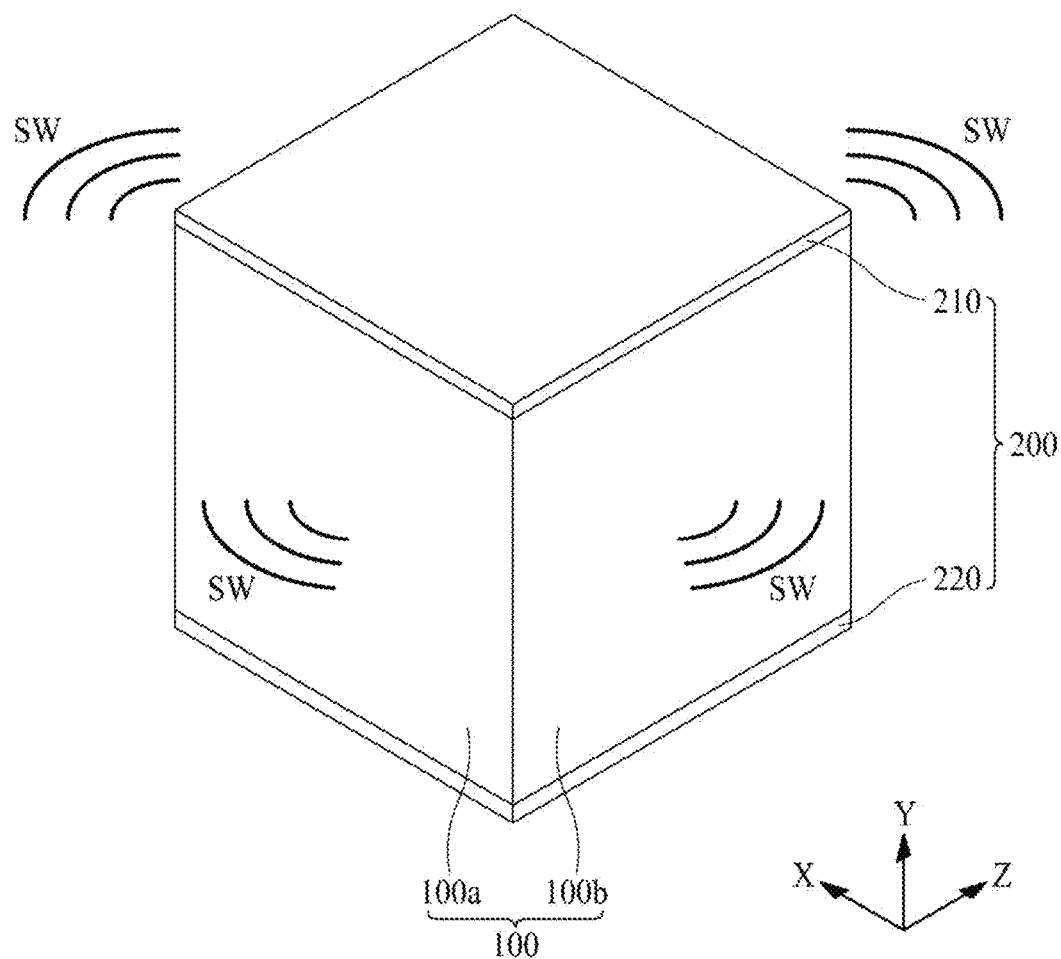
FIG. 1 is a perspective view of a display apparatus according to an embodiment of the present disclosure.

Reference will now be made in detail to embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure the important point of the present disclosure, the detailed description of such known function or configuration may be omitted. When "comprise," "have," and "include" described in the present disclosure are used, another part may be added unless a more limiting term, such as "only" is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)" is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms such as "first," "second," ""A,' 'B,' '(a),' '(b),' may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed elements. For example, the meaning of "at least one of a first element, a second element, and a third element" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device, which is a final consumer device or an application product including the LCM or the OLED module.

In some embodiments, an LCM or an OLED module including a display panel and a driver may be referred to as a narrow-sense display apparatus, and an electronic apparatus, which is a final product including an LCM or an OLED module may be referred to as a set apparatus. For example, the narrow-sense display apparatus may include a display panel, such as an LCD or an OLED, and a source printed circuit board (PCB), which is a controller for driving the display panel. The set apparatus may further include a set PCB which is a set controller electrically connected to the source PCB to overall control the set apparatus.

A display panel applied to an embodiment may use any type of display panel, such as a liquid crystal display panel, an organic light emitting diode (OLED) display panel, and an electroluminescent display panel, but embodiments are not limited to a specific display panel. A display panel applied to an embodiment may be vibrated by a sound generation device to output sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact, and may reduce or prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

Hereinafter, example embodiments of the present disclosure will be described in detail with reference to the accompanying drawings. In the following description, when the detailed description of the relevant known function or configuration is determined to unnecessarily obscure the present disclosure, the detailed description may be omitted. Also, for convenience of description, a scale of each of elements illustrated in the accompanying drawings differs from a real scale, and thus, is not limited to a scale illustrated in the drawings.

Figure 2:
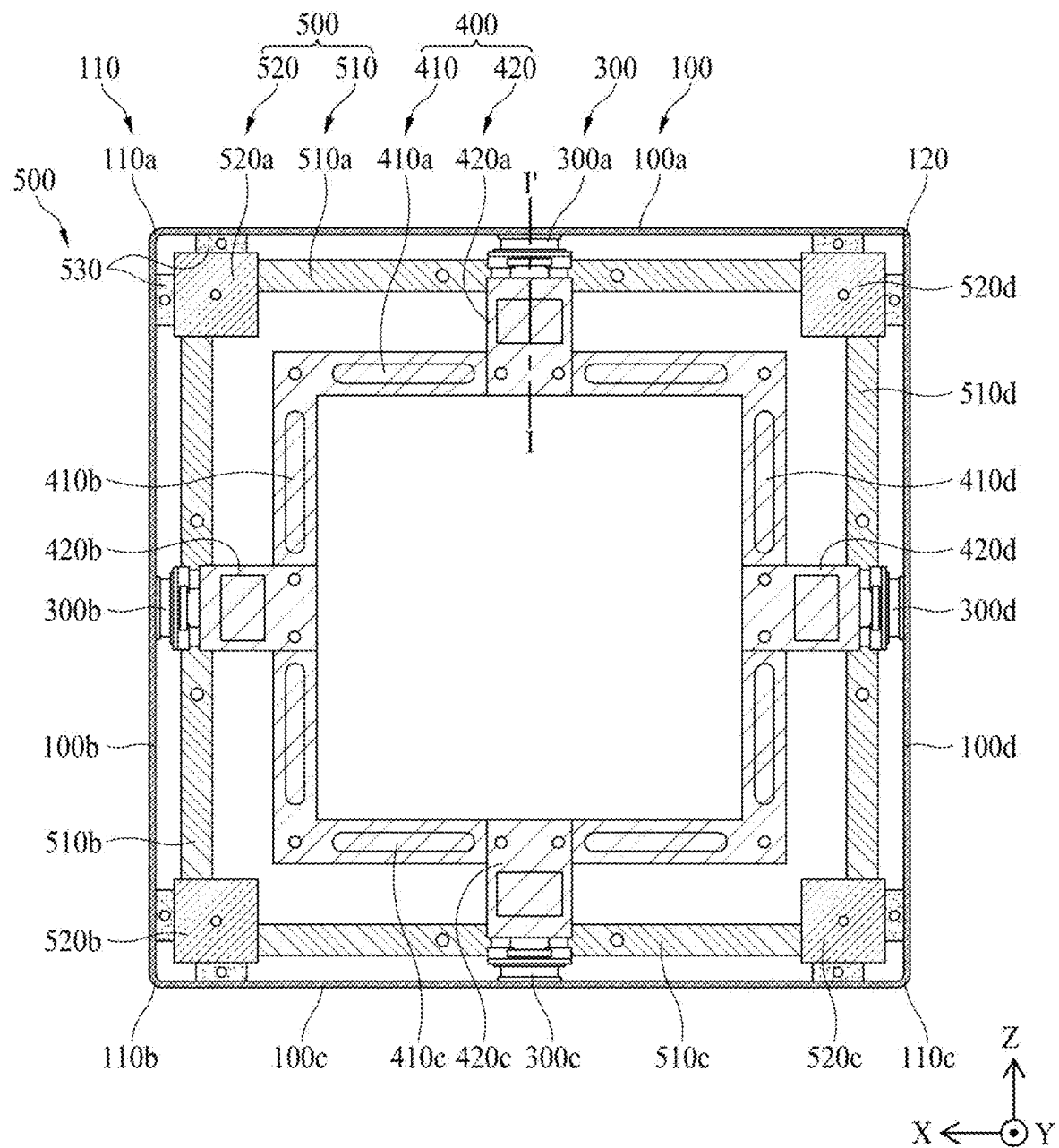
FIG. 2 is a plan view of a display apparatus according to a first embodiment of the present disclosure.
Figure 3:
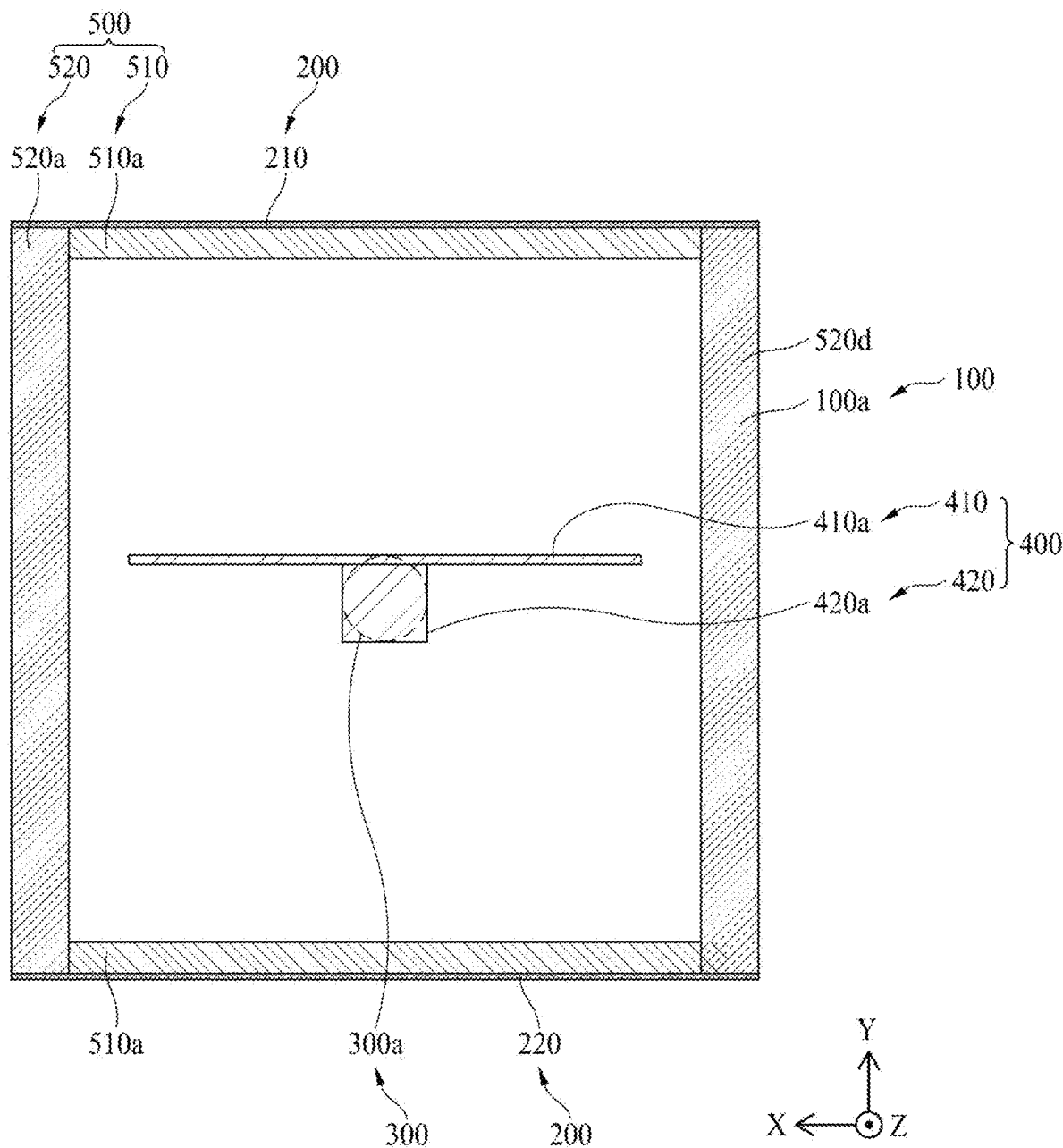
FIG. 3 is a rear view of a display surface of a display panel in the display apparatus of FIG. 2.
Figure 4:
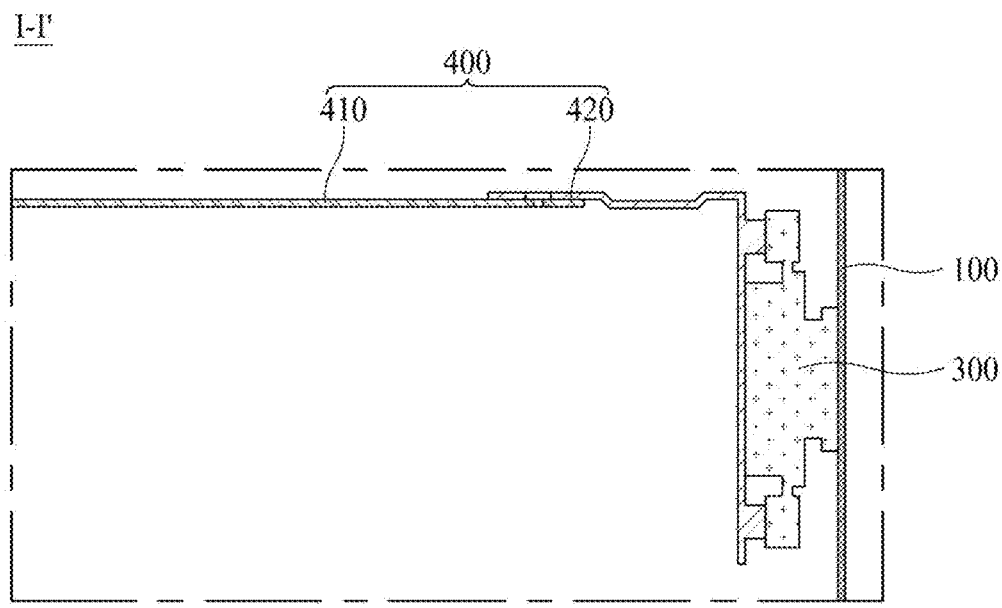
FIG. 4 is a cross-sectional view taken along the line I-I' of FIG. 2.

FIG. 1 is a perspective view of a display apparatus according to an embodiment of the present disclosure. FIG. 2 is a plan view of a display apparatus according to a first embodiment of the present disclosure. FIG. 3 is a rear view of a display surface of a display panel in the display apparatus of FIG. 2. FIG. 4 is a cross-sectional view taken along line I-I' of FIG. 2.

With reference to FIGS. 1 to 4, a display apparatus may include a display panel 100, a housing 200, a vibration generating device 300, a vibration support 400, and a panel support 500.

The display panel 100 may display an image and may be implemented as any type of display panel, such as a liquid crystal display panel, an organic light emitting diode (OLED) display panel, and an electroluminescent display panel, etc.

The display panel 100 may include a pixel array, which may display an image based on image data. In the pixel array, a plurality of data lines may intersect a plurality of gate lines, and a plurality of pixels may be arranged as a matrix type. Each of the plurality of pixels may include a red subpixel, green subpixel, and a blue subpixel for implementing colors. Also, each of the plurality of pixels may further include a white subpixel. Embodiments are not limited to these examples.

The display panel 100 may include a plurality of display surfaces, which display images in different directions. Also, the plurality of display surfaces may be implemented in a closed-loop structure and may display the same image or different images in various directions of the display apparatus. For example, the plurality of display surfaces may be implemented by bending one display panel 100, or may be implemented by coupling a plurality of display panels 100. Therefore, when the display panel 100 provided as one body includes the plurality of display surfaces, the display panel 100 may be implemented as a flexible display panel, a bendable display panel, or a foldable display panel. As another example, the display panel 100 according to the present disclosure may be implemented as a commercial display apparatus for airports or train stations.

According to an embodiment of the present disclosure, the display panel 100 may include four display surfaces (for example, first to fourth display surfaces) 100a, 100b, 100c, and 100d, which display images in all directions, e.g., left, right, front, and rear directions, of the display apparatus. Hereinafter, an embodiment of the display panel 100 including the first to fourth display surfaces 100a to 100d will be described, but the display panel 100 according to an embodiment of the present disclosure is not limited thereto and may include various numbers of display surfaces. Therefore, the display panel 100 may display images in various directions of the display apparatus, thereby increasing convenience of a user. Also, the display panel 100 may include four display surfaces, and an internal or inner space surrounded by the four display surfaces may perform a function of a woofer, which may output sound in a low frequency domain. Thus, the display apparatus according to an embodiment of the present disclosure may enhance a sound pressure level (SPL) of the low frequency domain even without including a separate woofer.

According to an embodiment of the present disclosure, the display panel 100 may be provided as one body and may be bent, and thus, may include a plurality of display surfaces. For example, when the display panel 100 includes the first to fourth display surfaces 100a to 100d, the display panel 100 may include first to third bending portions 110a, 110b and 110c and a connection portion 120. The first bending portion 110a may be between the first display surface 100a and second display surface 100b, the second bending portion 110b may be between the second display surface 100b and the third display surface 100c, the third bending portion 110c may be between the third display surface 100c and the fourth display surface 100d, and the connection portion 120 may connect the first display surface 100a to the fourth display surface 100d. Also, a bending portion 110 of the display panel 100 may display an image, or may divide images displayed by two adjacent display surfaces.

The housing 200 may configure an external appearance of the display apparatus along with the plurality of display surfaces of the display panel 100. For example, when the first to fourth display surfaces 100a to 100d are respectively disposed in a forward region, a left region, a rearward region, and a right region, the housing 200 may include first and second housings 210 and 220 respectively facing an upward direction and a downward direction of the display apparatus. The housing 200 may support the first to fourth display surfaces 100a to 100d and may accommodate and protect internal elements of the display apparatus.

The vibration generating device 300 may vibrate the display panel 100 to output sound SW toward a forward region in front of the display panel 100. The vibration generating device 300 may vibrate based on a vibration signal corresponding to a sound signal associated with an image using the vibration support 400 as a supporter to vibrate the display panel 100, and the display panel 100 may output the sound SW toward a corresponding display surface of the display panel 100. Therefore, using the display panel 100 as a vibration plate of a sound device, the display apparatus may output the sound SW toward the forward region FD, instead of toward a rearward region and a downward region with respect to the display panel 100, and thus, may allow an image displayed by the display apparatus to match an output position of the sound SW generated by the display apparatus, thereby enhancing an immersion experience of a viewer who is viewing the image displayed by the display apparatus.

When the display panel 100 includes the plurality of display surfaces, the vibration generating device 300 may include a plurality of vibration generating devices, which may vibrate the plurality of display surfaces. According to an embodiment of the present disclosure, when the display panel 100 includes the first to fourth display surfaces 100a to 100d, the vibration generating device 300 may include first to fourth vibration generating devices 300a, 300b, 300c, and 300d, which respectively vibrate the first to fourth display surfaces 100a to 100d. For example, the first vibration generating device 300a may vibrate the first display surface 100a to output a sound SW toward a forward region in front of the display apparatus. Also, the second to fourth vibration generating devices 300b to 300d may respectively vibrate the second to fourth display surfaces 100b to 100d to output the sound SW to a left region, a rearward region, and a right region with respect to the display apparatus. The sounds SW output by each of the first to fourth vibration generating devices 300a to 300d may be the same as or different from each other. Here, FIGS. 2 and 3 illustrate the display apparatus where one vibration generating device is disposed on each display surface, but without being limited thereto, a plurality of vibration generating devices 300 may be disposed on each display surface. Also, the plurality of vibration generating devices 300 may each be a speaker, and for example, may each be a sound actuator, a sound exciter, or a piezoelectric device, but is not limited thereto. In other embodiments, the vibration generating devices 300 may be a sound device for outputting sound according to an electrical signal.

The vibration support 400 may be surrounded by the plurality of display surfaces of the display panel 100 and may support the plurality of vibration generating devices 300. According to an embodiment of the present disclosure, the vibration support 400 may support the plurality of vibration generating devices 300, which respectively vibrate the plurality of display surfaces for displaying images in all directions with respect to the display apparatus. For example, the vibration support 400 may have a closed-loop structure provided as one body, and thus, may simultaneously support the plurality of vibration generating devices 300, which vibrate in different directions. Therefore, because the vibration support 400 supports the plurality of vibration generating devices 300, which vibrate in all directions with respect to the display apparatus, the vibration support 400 may disperse a vibration generated by one vibration generating device 300 to complement a total supporting force. Also, using a supporting force corresponding to each of some vibration generating devices 300, the vibration support 400 may reinforce a supporting force corresponding to each of some other vibration generating devices 300.

The vibration support 400 may include a supporting frame 410 and a plurality of connection brackets 420. The supporting frame 410 may have a closed-loop structure where a plurality of bars are provided as one body, and the plurality of connection brackets 420 may respectively connect the plurality of bars to a plurality of vibration generating devices.

According to an embodiment of the present disclosure, the supporting frame 410 may have a closed-loop structure where first to fourth bars 410a, 410b, 410c and 410d are provided as one body, and the first to fourth bars 410a to 410d may be respectively connected to first to fourth connection brackets 420a, 420b, 420c and 420d and may respectively support the first to fourth vibration generating devices 300a to 300d. Accordingly, the first to fourth bars 410a to 410d may be provided as one body, and thus, may simultaneously support the first to fourth vibration generating devices 300a to 300d, which respectively vibrate toward the forward region, the left region, the rearward region, and the right region with respect to the display apparatus.

For example, the first bar 410a may support the first vibration generating device 300a and may disperse a vibration, generated by the first vibration generating device 300a, to the second to fourth bars 410b, 410c and 410d. The second bar 410b may support the second vibration generating device 300b and may disperse a vibration, generated by the second vibration generating device 300b, to the first bar 410a, third bar 410c, and fourth bar 410d. Here, the first bar 410a may be bent vertically from the second bar 410b and fourth bar 410d, and the second bar 410b may be bent vertically from the first bar 410a and third bar 410c. Therefore, each of the first to fourth bars 410a to 410d may be bent vertically from a bar adjacent thereto and may disperse a vibration, generated by the vibration generating device 300, to the bar(s) adjacent thereto. For example, two adjacent bars among the first to fourth bars 410a to 410d may be extended in different directions, for example, in directions vertical to each other. Accordingly, each of the first to fourth bars 410a to 410d may be bent vertically from the bar(s) adjacent thereto and may support the plurality of vibration generating devices 300, which vibrate in all directions of the display apparatus, thereby dispersing the vibration generated by the vibration generating device 300 and complementing a total supporting force of the vibration generating device 300.

According to an embodiment of the present disclosure, the first bar 410a may support the first vibration generating device 300a and may support the second to fourth bars 410b, 410c, and 410d. The second bar 410b may support the second vibration generating device 300b and may support the first bar 410a, third bar 410c, and fourth bar 410d. The first bar 410a may be supported by the second to fourth bars 410b, 410c, and 410d, and the second bar 410b may be supported by the first bar 410a, third bar 410c, and fourth bar 410d. Therefore, the first to fourth bars 410a to 410d may support one another, and thus, may complement a supporting force corresponding to each of the first to fourth vibration generating devices 300a to 300d. Therefore, the first to fourth bars 410a to 410d may complement a supporting force corresponding to each of the plurality of vibration generating devices 300, thereby reducing or minimizing the loss of a vibration and enhancing a sound output characteristic.

The vibration support 400 may dissipate heat occurring in the vibration generating device 300. According to an embodiment of the present disclosure, the first to fourth connection brackets 420a to 420d may transfer heat, occurring in each of the first to fourth vibration generating devices 300a to 300d, to the supporting frame 410. Therefore, each of the first to fourth connection brackets 420a to 420d may transfer heat, occurring in the vibration generating device 300, to the supporting frame 410 having a relatively wide area, and thus, may efficiently dissipate the heat occurring in the vibration generating device 300. Accordingly, the plurality of connection brackets 420 may transfer the heat, occurring in the vibration generating device 300, to the supporting frame 410, and thus, may prevent the heat occurring in the vibration generating device 300 from being transferred to the display panel 100, thereby decreasing an influence of heat on the image quality of the display panel 100.

The panel support 500 may be surrounded by the plurality of display surfaces 100, and may support the plurality of display surfaces 100. The panel support 500 may include a plurality of reinforcement frames 510 and a plurality of connection frames 520.

The plurality of reinforcement frames 510 may be disposed on a rear surface of the display panel 100 through a connection member 530, and may be supported by the plurality of connection frames 520 to support the plurality of display surfaces 100, respectively. According to an embodiment of the present disclosure, the first to fourth reinforcement frames 510a, 510b, 510c, and 510d may respectively support the first to fourth display surfaces 100a to 100d. For example, the first reinforcement frame 510a may be on a rear surface of the first display surface 100a to overlap an upper edge or periphery and a lower edge or periphery of the first display surface 100a, and may support the first display surface 100a. Also, the second reinforcement frame 510b may be on a rear surface of the second display surface 100b to overlap an upper edge or periphery and a lower edge or periphery of the second display surface 100b, and may support the second display surface 100b. Also, the first and second reinforcement frames 510a and 510b may be connected to each other through the first connection frame 520a.

According to an embodiment of the present disclosure, the reinforcement frame 510 may complement stiffness of the display panel 100 and may enhance a sound output characteristic of the vibration generating device 300. According to an embodiment of the present disclosure, each of the first to fourth reinforcement frames 510a to 510d may be disposed to overlap an upper edge or periphery and a lower edge or periphery of each of the first to fourth display surfaces 100a to 100d, and thus, may enhance an electromagnetic force (for example, Lorentz's force) of the vibration generating device 300. Thus, the reinforcement frames 510a to 510d may thereby reduce or prevent a reduction of a sound pressure level (SPL) in a high frequency domain. Here, a resonance frequency "$f_0$" of a vibration generated by the vibration generating device 300 may be determined as in the following Equation (1).

$$f_0 = \frac{1}{2\pi}\sqrt{\frac{k}{m}} \qquad \text{[Equation 1]}$$

Here, 'k' denotes a stiffness of an object, and 'm' denotes a mass of the object. For example, the vibration generating device 300 may increase the stiffness 'k' of the object or may decrease the mass 'm' of the object, based on Equation (1), and thus, may enhance a vibration characteristic of the high frequency domain. As another example, the vibration generating device 300 may increase the mass 'm' of the object and may more greatly increase the stiffness 'k' of the object than an increase rate of the mass 'm', thereby enhancing the vibration characteristic of the high frequency domain. Therefore, in the display apparatus, the panel support 500 may be disposed in a rear edge or periphery of the display panel 100, thereby reducing and/or minimizing an increase in mass 'm' of the display panel 100 as a vibration plate and complementing the stiffness 'k' of the display panel 100. Accordingly, the display apparatus may enhance an electromagnetic force of the vibration generating device 300 acting on the display panel 100, and thus, may prevent a sound pressure level from being reduced in the high frequency domain, thereby enhancing flatness of a sound pressure level of a full frequency domain and enhancing clarity of sound.

Each of the plurality of connection frames 520 may be in a corner portion of a closed-loop structure configured by the plurality of display surfaces 100. According to an embodiment of the present disclosure, each of the first to fourth connection frames 520*a* to 520*d* may be in the corner portion of the closed-loop structure configured by the first to fourth display surfaces 100*a* to 100*d*. For example, the first connection frame 520*a* may connect the first reinforcement frame 510*a* to the second reinforcement frame 510*b*, and the second connection frame 520*b* may connect the second reinforcement frame 510*b* to the third reinforcement frame 510*c*. Also, each of the first to fourth connection frames 520*a* to 520*d* may be disposed adjacent to the first to third bending portions 110*a* to 110*c* and the connection portion 120. Therefore, the plurality of connection frames 520 may connect the plurality of reinforcement frames 510 to the closed-loop structure configured by the plurality of display surfaces 100 to enhance a supporting force of each of the plurality of reinforcement frames 510, and the plurality of reinforcement frames 510 may stably support the display panel 100 to enhance a stiffness of the display panel 100. Accordingly, the display apparatus may support the display panel 100 through the plurality of reinforcement frames 510 and the plurality of connection frames 520, thereby enhancing a sound output characteristic of the display apparatus.

Figure 5:
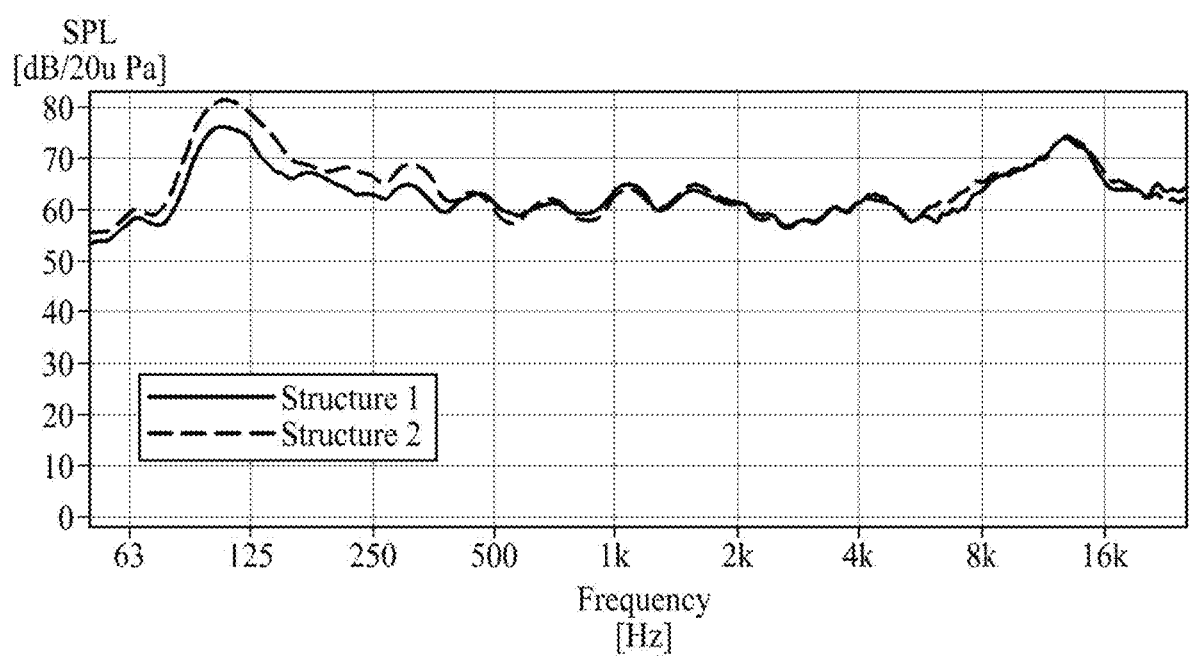
FIG. 5 illustrates a sound output characteristic of a display apparatus according to an embodiment of the present disclosure.

FIG. 5 illustrates a sound output characteristic of a display apparatus according to an embodiment of the present disclosure. For example, a first structure (Structure 1) illustrated by a solid line may correspond to a display apparatus which does not include a vibration support, and a second structure (Structure 2) illustrated by a dashed line may correspond to a display apparatus according to an embodiment of the present disclosure. Also, the first and second structures may be assumed as including the same elements, except for the vibration support.

With reference to FIG. 5, in a display apparatus having the first structure, a sound pressure level (SPL) decreases in the low frequency domain (or a low sound range) of about 400 Hz or less. Therefore, it may be seen that a supporting force of a vibration generating device vibrating each of a plurality of display surfaces is insufficient, and due to this, vibration loss occurs in each of the plurality of display surfaces. Here, as in the following Equation (2), a sound pressure level "Lp" denotes that a ratio of a sound pressure "prms" to a previous sound pressure "pref" is represented by a log scale.

$$Lp = 20\ \log_{10} \frac{p_{rms}}{p_{ref}} \quad \text{[Equation 2]}$$

The sound pressure "prms" denotes a root mean square value, and the previous sound pressure "pref" denotes a minimum assumed value when a frequency of a sound is 1 kHz. For example, when the previous sound pressure "pref" is a sound wave in air, the previous sound pressure "pref" may correspond to 20 u Pa (pref=20 u Pa).

It may be seen that, in the second structure of the display apparatus according to an embodiment of the present disclosure, a sound pressure level of the low frequency domain (or the low sound range) of about 400 Hz or less increases compared to the display apparatus having the first structure. Therefore, it may be seen that, because the display apparatus includes the vibration support 400, a total supporting force of the vibration generating device 300 vibrating each of the plurality of display surfaces is reinforced, and there is less vibration loss.

Therefore, it may be seen that, in a display apparatus having the second structure according to an embodiment of the present disclosure, a sound pressure level in the low frequency domain is more clearly enhanced than a display apparatus having the first structure. Therefore, the display apparatus according to an embodiment of the present disclosure supports the plurality of vibration generating devices 300, which vibrate in all directions of the display apparatus, and thus, complements a total supporting force and disperses a vibration generated by the vibration generating device 300 to enhance the sound pressure level in the low frequency domain.

Figure 6:
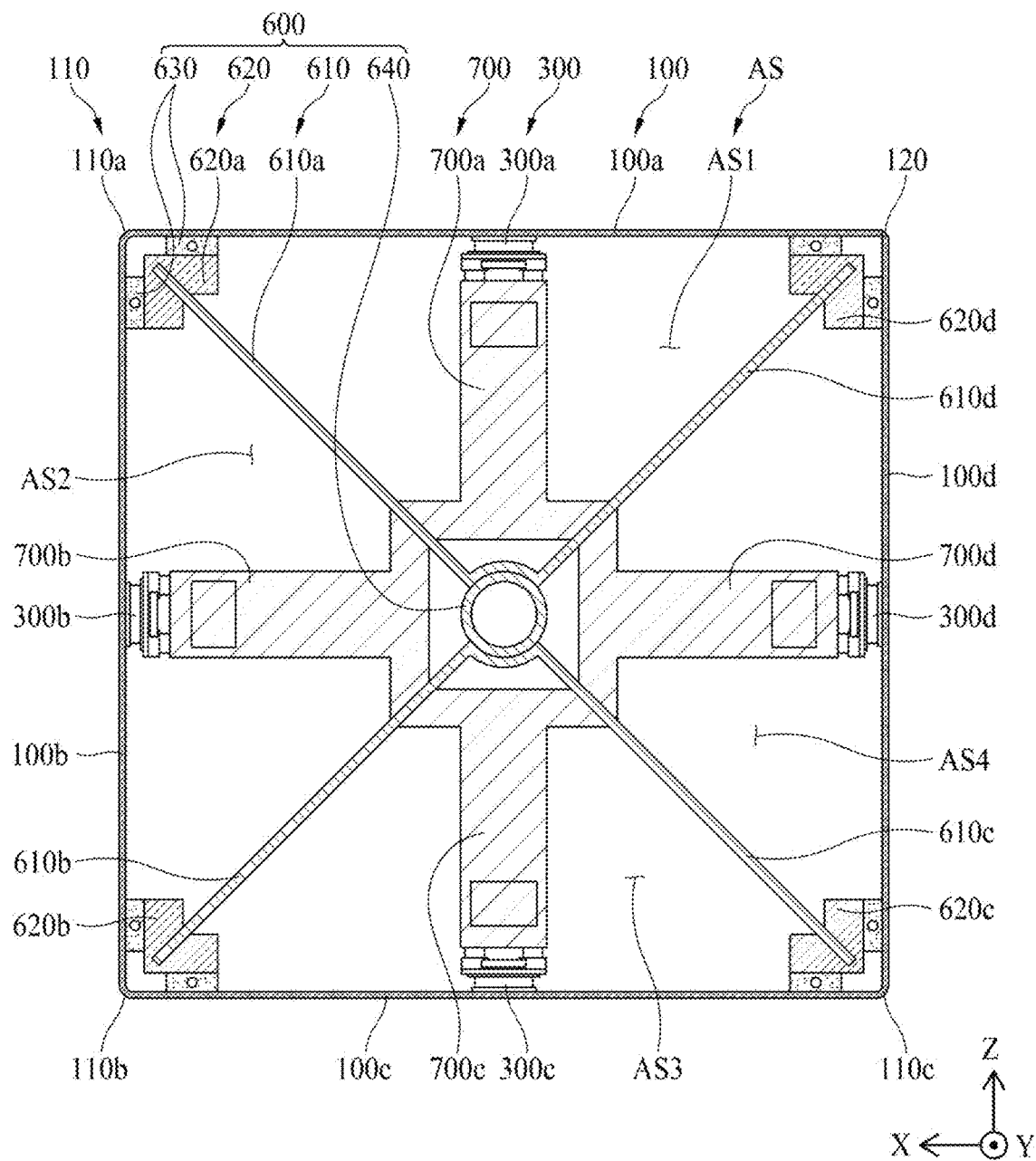
FIG. 6 is a plan view of a display apparatus according to a second embodiment of the present disclosure.
Figure 7:
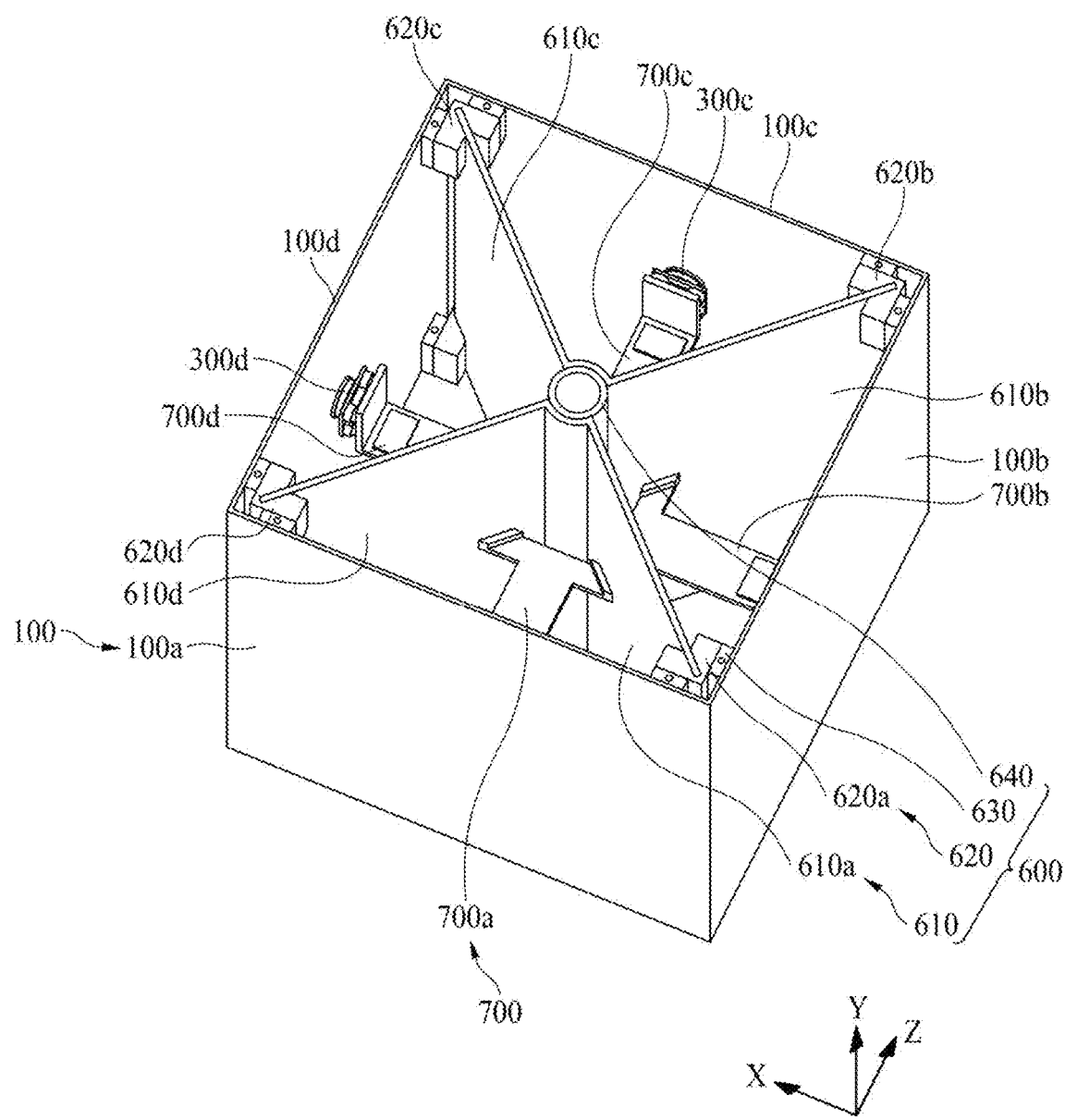
FIG. 7 is an internal perspective view of the display apparatus of FIG. 6.

FIG. 6 is a plan view of a display apparatus according to a second embodiment of the present disclosure. FIG. 7 is an internal perspective view of the display apparatus of FIG. 6. Here, the display apparatus according to the second embodiment of the present disclosure may not include the vibration support 400 and the panel support 500 according to the first embodiment but may further include a separation part 600 and a plurality of vibration supports 700. Hereinafter, the same elements as the above-described elements will be briefly described or are not described.

With reference to FIGS. 6 and 7, the display apparatus according to the second embodiment of the present disclosure may include a display panel 100, a housing 200, a vibration generating device 300, a separation part 600, and a vibration support 700.

The display panel 100 may include a plurality of display surfaces, which may display images in different directions. Also, the plurality of display surfaces may be implemented in a closed-loop structure and may display the same image or different images in various directions of the display apparatus. For example, the plurality of display surfaces may be implemented by bending one display panel 100, or may be implemented by coupling or connecting a plurality of display panels 100. Therefore, when the display panel 100 provided as one body includes the plurality of display surfaces, the display panel 100 may be implemented as a flexible display panel, a bendable display panel, or a foldable display panel. As another example, the display panel 100 according to an embodiment of the present disclosure may be implemented as a commercial display apparatus for airports or train stations.

According to an embodiment of the present disclosure, the display panel 100 may include four display surfaces (for example, first to fourth display surfaces) 100*a* to 100*d*, which may display images in all directions, e.g., left, right, front, and rear directions, of the display apparatus. Also, the display panel 100 may include first to third bending portions 110*a* to 110*c* and a connection portion 120.

The housing 200 may configure an external appearance of the display apparatus along with the plurality of display surfaces of the display panel 100. For example, when the first to fourth display surfaces 100*a* to 100*d* are respectively disposed in a forward region, a left region, a rearward region, and a right region, the housing 200 may include first and second housings 210 and 220 respectively facing an upward direction and a downward direction of the display apparatus.

When the display panel 100 includes the plurality of display surfaces, the vibration generating device 300 may include a plurality of vibration generating devices, which may vibrate the plurality of display surfaces. According to an embodiment, the vibration generating device 300 may include first to fourth vibration generating devices 300a to 300d, which respectively vibrate the first to fourth display surfaces 100a to 100d. For example, the first vibration generating device 300a may vibrate the first display surface 100a to output a sound SW to a forward region in front of the display apparatus. Also, the second to fourth vibration generating devices 300b to 300d may respectively vibrate the second to fourth display surfaces 100b to 100d to output the sound SW to a left region, a rearward region, and a right region with respect to the display apparatus. The sounds SW output by each of the first to fourth vibration generating devices 300a to 300d may be the same as or different from each other. Here, FIGS. 6 and 7 illustrate the display apparatus where one vibration generating device is disposed on each display surface, but without being limited thereto, a plurality of vibration generating devices 300 may be disposed on each display surface. Also, the plurality of vibration generating devices 300 may each be a speaker, and for example, may each be a sound actuator, a sound exciter, or a piezoelectric device, but is not limited thereto. In other embodiments, the vibration generating devices 300 may each be a sound device for outputting sound according to an electrical signal.

The separation part 600 may be surrounded by the plurality of display surfaces 100 and may separate spaces respectively corresponding to the plurality of display surfaces 100. According to an embodiment of the present disclosure, the separation part 600 may separate first to fourth air spaces AS1, AS2, AS3, and AS4 respectively corresponding to the first to fourth display surfaces 100a to 100d. The first to fourth display surfaces 100a to 100d and the separation part 600 may surround the first to fourth air spaces AS1 to AS4. For example, a vibration generated by the first vibration generating device 300a may be transferred to the first air space AS1, and a vibration generated by the second vibration generating device 300b may be transferred to the second air space AS2. In this case, the separation part 600 may prevent a vibration of the first air space AS1 from being transferred to the second air space AS2 or fourth air space AS4. Also, the separation part 600 may prevent a vibration of the second air space AS2 from being transferred to the first air space AS1 or third air space AS3. Therefore, the separation part 600 may allow the vibration of the first air space AS1 to concentrate on the first display surface 100a and may allow the vibration of the second air space AS2 to concentrate on the second display surface 100b. Accordingly, the separation part 600 may decrease or minimize the loss of vibrations and interference between sounds generated by the first to fourth vibration generating devices 300a to 300d and may enhance a sound output characteristic of each of the first to fourth display surfaces 100a to 100d. The separation part 600 may be, for example, a baffle or an enclosure, but the term is not limited thereto.

The separation part 600 may reduce or prevent a vibration of each of the plurality of display surfaces from being transferred to an adjacent display surface. According to an embodiment of the present disclosure, a vibration of each of the first to fourth display surfaces 100a to 100d may not be transferred to an adjacent display surface by the separation part 600, and each of the first to fourth vibration generating devices 300a to 300d may independently vibrate each of the first to fourth display surfaces 100a to 100d. Accordingly, the display apparatus may independently vibrate each of the first to fourth display surfaces 100a to 100d, and thus, may allow an image displayed by the display apparatus to match a generated position of the sound generated by the display apparatus, thereby increasing a sense of reality of the image and enhancing an immersion experience of a viewer who is viewing the image displayed by the display apparatus.

The separation part 600 may include a plurality of partition walls 610 and a plurality of supports 620. The plurality of partition walls 610 may separate spaces respectively corresponding to adjacent display surfaces of the plurality display surfaces 100, and the plurality of supports 620 may fix the plurality of partition walls 610. According to an embodiment of the present disclosure, the plurality of supports 620 may be respectively disposed in corners of a closed-loop structure configured by the plurality of display surfaces 100, and each of the plurality of partition walls 610 may extend from a center of the closed-loop structure, configured by the plurality of display surfaces 100, to each of the plurality of supports 620, and may support the plurality of display surfaces 100.

The separation part 600 may further include a connection member 630 and a center shaft or axis 640. The connection member 630 may couple or connect each of the plurality of supports 620 to one surface of the display panel 100, and the center shaft or axis 640 may support the plurality of partition walls 610. For example, each of the plurality of partition walls 610 may be between each of the plurality of supports 620 and the center shaft or axis 640. According to an embodiment of the present disclosure, the center shaft or axis 640 may extend a line for supplying a sound signal to the first to fourth vibration generating devices 300a to 300d.

According to an embodiment of the present disclosure, the separation part 600 may include first to fourth partition walls 610a, 610b, 610c, and 610d, which separate the first to fourth air spaces AS1 to AS4. Also, first to fourth supports 620a, 620b, 620c, and 620d may be respectively disposed in the corners of the closed-loop structure configured by the first to fourth display surfaces 100a to 100d, and the center shaft or axis 640 may be disposed in a center of the closed-loop structure configured by the first to fourth display surfaces 100a to 100d. Therefore, each of the first to fourth partition walls 610a to 610d may be disposed between the center shaft axis 640 and each of the first to fourth supports 620a to 620d.

For example, the first partition wall 610a may be between the first support 620a and the center shaft or axis 640 to separate the first air space AS1 from the second air space AS2, and the second partition wall 610b may be between the second support 620b and the center shaft 640 to separate the second air space AS2 from the third air space AS3. Also, the first air space AS1 may be surrounded by the first display surface 100a and the first partition wall 610a and fourth partition wall 610d, and the second air space AS2 may be surrounded by the second display surface 100b and the first partition wall 610a and second partition wall 610b. Also, the connection member 630 may fix the first support 620a to the first and second display surfaces 100a and 100b, and for example, may be fixed to a corner between the first and second display surfaces 100a and 100b. Also, the connection member 630 may fix the second support 620b to the second and third display surfaces 100b and 100c, and for example, may be fixed to the corner between the second and third display surfaces 100b and 100c. Therefore, the plurality of partition walls 610, the plurality of supports 620, the connection member 630, and the center shaft 640 may be solidly coupled or connected to the closed-loop structure configured by the first to fourth display surfaces 100a to 100d, and thus, may separate the first to fourth air spaces AS1 to AS4.

The plurality of supports 620 may be disposed to overlap corners of the plurality of display surfaces 100. According to an embodiment of the present disclosure, the first support 620a and fourth support 620d may be disposed in corners of the first display surface 100a, and the first support 620a and second support 620b may be disposed in corners of the second display surface 100b. The plurality of supports 620 may be formed through a molding process and may include silicone or rubber, but is not limited thereto. Therefore, the plurality of supports 620 may be disposed in the corners of the first to fourth display surfaces 100a to 100d and may be mutually supported by the plurality of partition walls 610, thereby stably supporting the display panel 100.

The vibration support 700 may be between the vibration generating device 300 and the separation part 600 to support the vibration generating device 300. According to an embodiment of the present disclosure, the vibration support 700 may support the plurality of vibration generating devices 300 which respectively vibrate the plurality of display surfaces 100 for displaying images in all directions with respect to the display apparatus. Each of the plurality of vibration supports 700 may be disposed between two adjacent partition walls of the plurality of partition walls 610. Also, the plurality of vibration supports 700 may be fixed by the separation part 600 and may simultaneously support the plurality of vibration generating devices 300, which vibrate in different directions.

According to an embodiment of the present disclosure, first to fourth vibration supports 700a, 700b, 700c, and 700d may be fixed by the separation part 600 and may respectively support the first to fourth vibration generating devices 300a to 300d. Also, each of the first to fourth vibration supports 700a to 700d may be between adjacent partition walls of the plurality of partition walls 610. For example, the first vibration support 700a may be fixed between the first partition wall 610a and fourth partition wall 610d and may support the first vibration generating device 300a, and the second vibration support 700b may be fixed between the first partition wall 610a and second partition wall 610b, and may support the second vibration generating device 300b.

According to an embodiment of the present disclosure, the first to fourth vibration supports 700a to 700d may be disposed to be symmetrical with respect to the separation part 600. For example, the first vibration support 700a may be symmetrical with the second vibration support 700b with respect to the first partition wall 610a, may be symmetrical with the third vibration support 700c with respect to the center shaft 640, and may be symmetrical with the fourth vibration support 700d with respect to the fourth partition wall 610d. Therefore, because the first to fourth vibration supports 700a to 700d are disposed to be symmetrical with respect to the separation part 600, the first to fourth vibration supports 700a to 700d may mutually complement the supporting forces of the first to fourth vibration generating devices 300a to 300d, which vibrate toward different directions.

For example, the first vibration support 700a may support the first vibration generating device 300a and may dispose a vibration, generated by the first vibration generating device 300a, to the second to fourth vibration supports 700b to 700d. The second vibration support 700b may support the second vibration generating device 300b and may dispose a vibration, generated by the second vibration generating device 300b, to the first, third, and fourth vibration supports 700a, 700c, and 700d. Also, the first vibration support 700a may support the first vibration generating device 300a and may support the second to fourth vibration supports 700b to 700d. The second vibration support 700b may support the second vibration generating device 300b and may support the first, third, and fourth vibration supports 700a, 700c, and 700d. As described above, because the first to fourth vibration supports 700a to 700d are disposed to be symmetrical with respect to the separation part 600, the first to fourth vibration supports 700a to 700d may disperse vibrations generated by the plurality of vibration generating devices 300 and may mutually complement the supporting forces of each of the plurality of vibration generating devices 300, thereby reducing or minimizing the loss of the vibrations to enhance a sound output characteristic.

Each of the plurality of vibration supports 700 may extend in a direction vertical (e.g., perpendicular) to a corresponding display surface, and each of the plurality of partition walls 610 may extend in a diagonal or shifted direction with respect to an extension direction of each of the plurality of vibration supports 700. For example, the extension direction of each of the partition walls 610 may be not aligned with the extension direction of each of the plurality of vibration supports 700, and may form a certion angle with respect to the the extension direction of each of the plurality of vibration supports 700. According to an embodiment of the present disclosure, each of the first to fourth vibration supports 700a to 700d may extend in a direction vertical (e.g., perpendicular) to the first to fourth display surfaces 100a to 100d. Also, each of the first to fourth partition walls 610a to 610d may extend from the center of the closed-loop structure, configured by the first to fourth display surfaces 100a to 100d, to each of the first to fourth supports 620a to 620d. Accordingly, each of the first to fourth partition walls 610a to 610d may extend in a diagonal or shifted direction (e.g., 45 degrees) with respect to an extension direction of each of the first to fourth vibration supports 700a to 700d, and may support the plurality of vibration supports 700 and the plurality of display surfaces 100.

Each of the plurality of vibration supports 700 may transfer heat, occurring in each of the plurality of vibration generating devices 300, to the separation part 600. According to an embodiment of the present disclosure, each of the first to fourth vibration supports 700a to 700d may transfer heat, occurring in each of the first to fourth vibration generating devices 300a to 300d, to partition walls 610 adjacent thereto. For example, the first vibration support 700a may transfer heat, occurring in the first vibration generating device 300a, to the first and fourth partition walls 610a and 610d, and the second vibration support 700b may transfer heat, occurring in the second vibration generating device 300b, to the first partition wall 610a and second partition wall 610b. Therefore, each of the first to fourth vibration supports 700a to 700d may transfer heat, occurring in the vibration generating device 300, to the plurality of partition walls 610 having a relatively wide area, and thus, may efficiently dissipate the heat occurring in the vibration generating device 300. Accordingly, the plurality of vibration supports 700 may transfer the heat, occurring in the vibration generating device 300, to the separation part 600, and thus, may reduce or prevent the heat occurring in the vibration generating device 300 from being transferred to the display panel 100.

Figure 8:
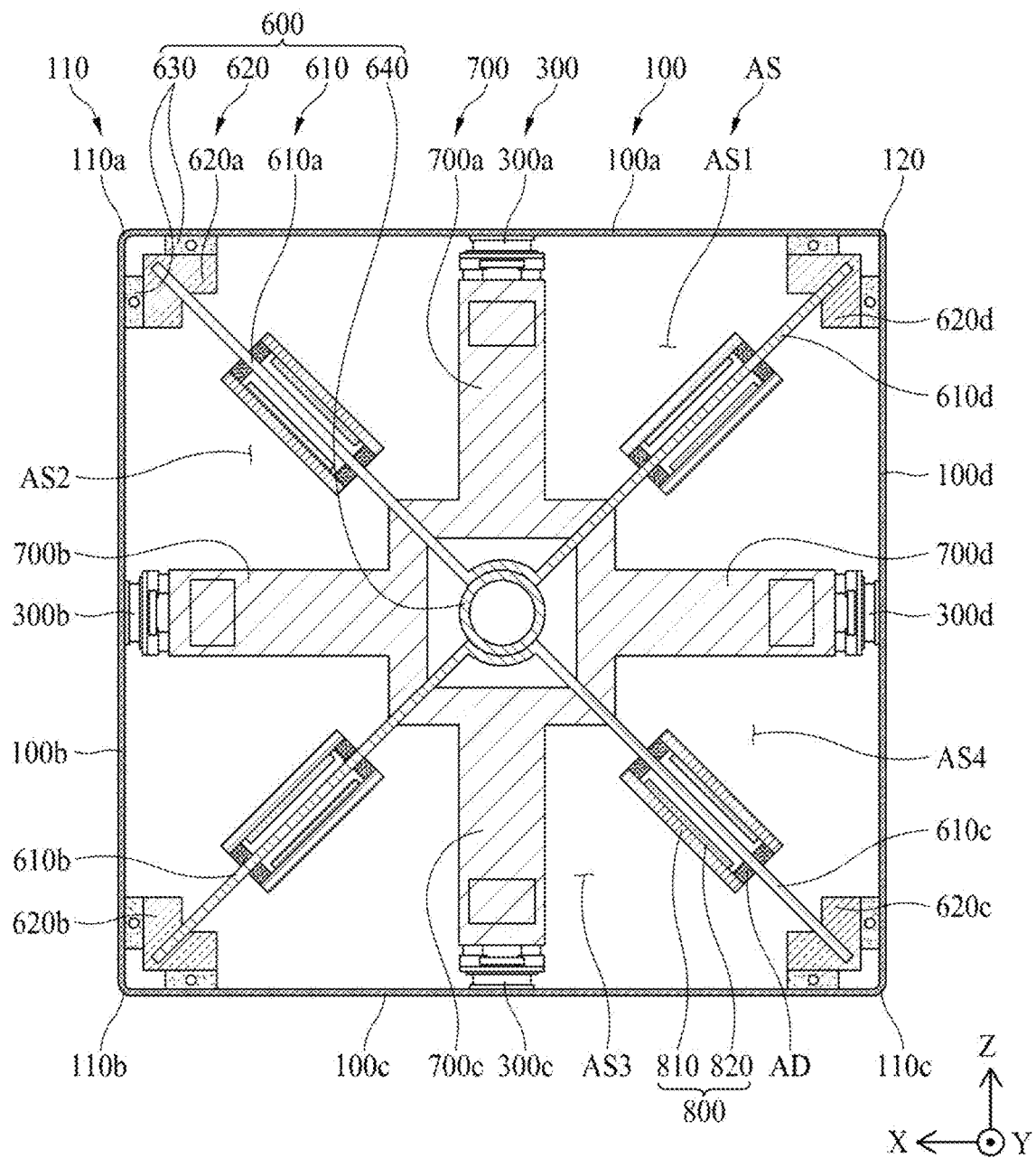
FIG. 8 is a plan view of a display apparatus including a sound absorption member according to an embodiment of the present disclosure.
Figure 9A:
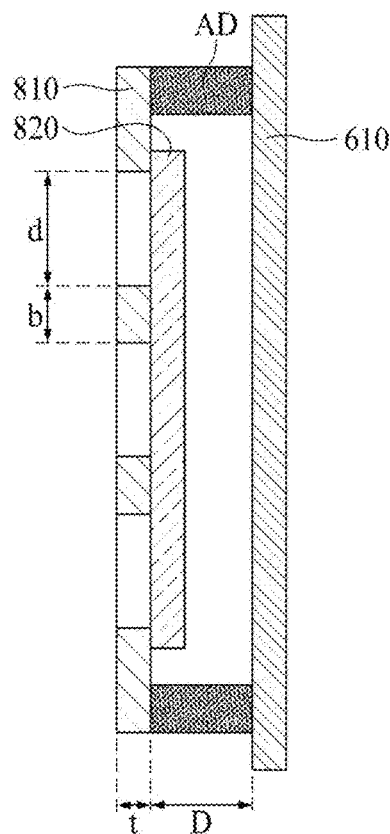
FIGS. 9A and 9B illustrate a sound absorption member in the display apparatus of FIG. 8.
Figure 9B:
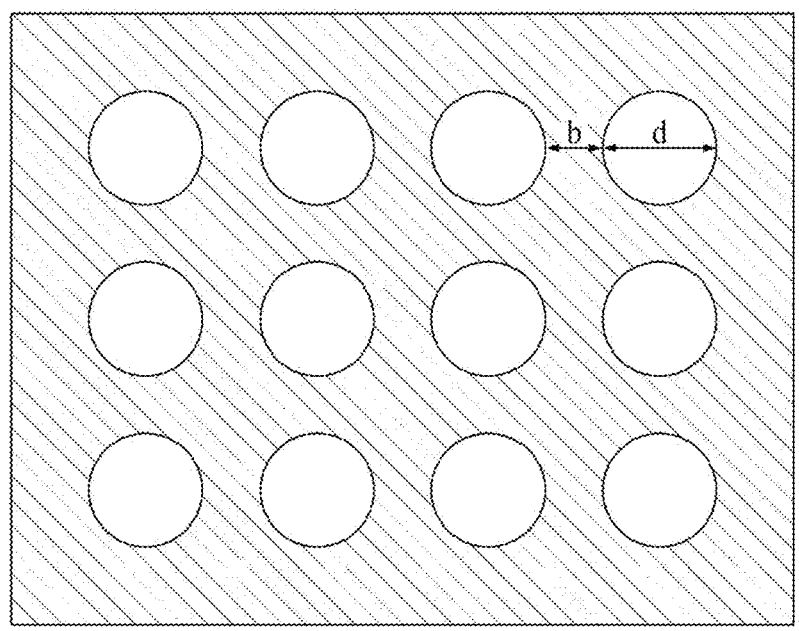

FIG. 8 is a plan view of a display apparatus further including a sound absorption member according to an embodiment of the present disclosure. FIGS. 9A and 9B illustrate a sound absorption member in the display apparatus of FIG. 8. FIG. 9A is a cross-sectional view of the sound absorption member of the display apparatus of FIG. 8. FIG. 9B is a plan view of a plate of the sound absorption member of FIG. 9A.

With reference to FIGS. 8, 9A, and 9B, the display apparatus may further include a sound absorption member 800, which is disposed on at least one surface of each of a plurality of partition walls 610 and controls a specific frequency of a sound generated by each of a plurality of vibration generating devices 300. For example, the sound absorption member 800 may be disposed on one surface of a first partition wall 610a facing a first air space AS1 and one surface of a fourth partition wall 610d facing the first air space AS1, and may control a specific frequency of a sound generated by a first vibration generating device 300a. Also, the sound absorption member 800 may be on one surface of the first partition wall 610a facing a second air space AS2 and one surface of a second partition wall 610b facing the second air space AS2, and may control a specific frequency of a sound generated by a second vibration generating device 300b.

For example, the sound absorption member 800 may be on one surface of each of the plurality of partition walls 610, or a plurality of sound absorption members 800 may be on the one surface of each of the plurality of partition walls 610.

The sound absorption member 800 may include a plate 810 and an absorption pad 820. The plate 810 may include a plurality of holes and may be spaced apart from at least one surface of each of the plurality of partition walls 610. According to an embodiment of the present disclosure, the plate 810 may be attached on at least one surface of each of the plurality of partition walls 610 by an adhesive member AD, and the adhesive member AD may be between an edge of the plate 810 and the partition wall 610. Accordingly, the plate 810 may be spaced apart from one surface of the partition wall 610 by a thickness D of the adhesive member AD.

According to an embodiment of the present disclosure, a diameter 'd' of each of the plurality of holes of the plate 810 may be determined based on a specific frequency of a sound controlled by the sound absorption member 800. For example, a sound absorption coefficient (SAC) of the sound absorption member 800 may be determined based on the following Equation (3).

$$\alpha = \frac{4r}{(1+r)^2 + (\omega m - \cot(\omega D/c))^2} \quad \text{[Equation 3]}$$

Here, 'α' denotes the SAC, 'r' denotes a relative resistance, 'ω' denotes a frequency (ω=2πf) of sound, 'm' denotes a relative acoustic mass of air, 'D' denotes a distance between the plate 810 and the partition wall 610, and 'c' denotes a speed of sound. The SAC 'α' of the sound absorption member 800 may be inversely proportional to the relative resistance 'r'.

The relative resistance 'r' may be determined based on the following Equation (4), and the relative acoustic mass 'm' of air may be determined based on the following Equation (5).

$$r = \frac{32\mu t}{d^2 p \rho c}\left(\sqrt{1+\frac{k^2}{32}} + \frac{\sqrt{2}\,k}{8}\frac{d}{t}\right) \quad \text{[Equation 4]}$$

-continued $$m = \frac{t}{pc}\left(1 + \frac{1}{\sqrt{9+\frac{k^2}{2}}} + 0.85\frac{d}{t}\right) \quad \text{[Equation 5]}$$

Here, 'd' denotes a diameter of the hole of the plate 810, 'p' denotes a perforation rate of the plate 810, 'ρ' denotes an air density, 'c' denotes a speed of sound, 'μ' denotes an air viscosity coefficient, 't' denotes a thickness of the plate 810 or a height of the hole, and 'k' denotes a perforation constant. The relative resistance 'r' may be proportional to the thickness 't' of the plate 810 and may be inversely proportional to the diameter 'd' of the hole of the plate 810. Also, the relative acoustic mass 'm' may be proportional to the thickness 't' of the plate 810.

According to an embodiment of the present disclosure, when the diameter 'd' of the hole of the plate 810 increases, the relative resistance 'r' may decrease, and when the relative resistance 'r' decreases, the SAC 'α' may increase. Here, as the SAC 'α' of the sound absorption member 800 increases, the display apparatus may absorb more sound having a specific frequency generated by the vibration generating device 300. In other words, as the SAC 'α' of the sound absorption member 800 increases, the display apparatus may more greatly reduce a sound pressure level having a specific frequency generated by the vibration generating device 300. Accordingly, in the display apparatus according to the present disclosure, the diameter 'd' of each of the plurality of holes of the plate 810 may increase, and thus, a sound pressure level of a specific frequency domain may decrease.

According to an embodiment of the present disclosure, when the perforation rate 'p' of the plate 810 increases, air may more freely pass through the holes of the plate 810, and the relative acoustic mass 'm' of air passing through the holes of the plate 810 may decrease. Also, when the relative acoustic mass 'm' decreases, the sound absorption coefficient 'α' may increase. Accordingly, in the display apparatus according to the present disclosure, the diameter 'd' of each of the plurality of holes of the plate 810 may increase, and thus, a sound pressure level of a specific frequency domain may decrease.

According to an embodiment of the present disclosure, when the thickness 't' of the plate 810 decreases, air may more freely pass through the holes of the plate 810, and the relative resistance 'r' may decrease. Also, when the relative resistance 'r' decreases, the SAC 'α' may increase. Accordingly, in the display apparatus according to an embodiment of the present disclosure, the thickness 't' of the plate 810 or a height of the hole of the plate 810 may decrease, and thus, a sound pressure level of a specific frequency domain may decrease.

The perforation constant 'k' may be determined based on the following Equation (6), and the perforation rate 'p' of the plate 810 may be determined based on the following Equation (7).

$$k = \sqrt{\frac{\omega \rho}{\mu}} \cdot \frac{d}{2} \quad \text{[Equation 6]}$$

$$p = \frac{\pi}{4}\left(\frac{d}{b}\right)^2 \quad \text{[Equation 7]}$$

Here, 'b' denotes an interval or distance between the plurality of holes of the plate 810. The perforation constant 'k' may be proportional to the diameter 'd' of the hole of plate 810, and the perforation rate 'p' of the plate 810 may be proportional to the square of the diameter 'd' of the hole of plate 810 and may be inversely proportional to the square of the interval 'b' between the plurality of holes. The perforation constant 'k' and the perforation rate 'p' may be factors for determining the relative resistance 'r' and the relative acoustic mass 'm', and thus, may be a factor for determining the SAC 'α' of the sound absorption member 800. Also, as seen in Equations (3) to (7), the frequency 'ω' of sound, a distance 'D' between the plate 810 and the partition wall 610, the air density 'ρ', and the air viscosity coefficient 'μ' may be factors for determining the SAC 'α' of the sound absorption member 800.

Therefore, the display apparatus according to an embodiment of the present disclosure may adjust the diameter 'd' of each of the plurality of holes of the plate 810 or the thickness 't' of the plate 810, and thus, may control a sound pressure level of a specific frequency domain.

The absorption pad 820 may be on one surface of the plate 810 facing the plurality of partition walls 610. Also, the absorption pad 820 may be disposed to overlap the plurality of holes of the plate 810. For example, a sound having a specific frequency generated by the vibration generating device 300 may have a sound pressure level which decreases while passing through the holes of the plate 810 and the absorption pad 820. Accordingly, the absorption pad 820 may be disposed on the one surface of the plate 810 to overlap the plurality of holes of the plate 810, and thus, may increase the SAC 'α' of the sound absorption member 800. For example, the absorption pad 820 may include at least one of acrylic foam, polyolefin foam, and polyurethane foam, but is not limited thereto.

Figure 10:
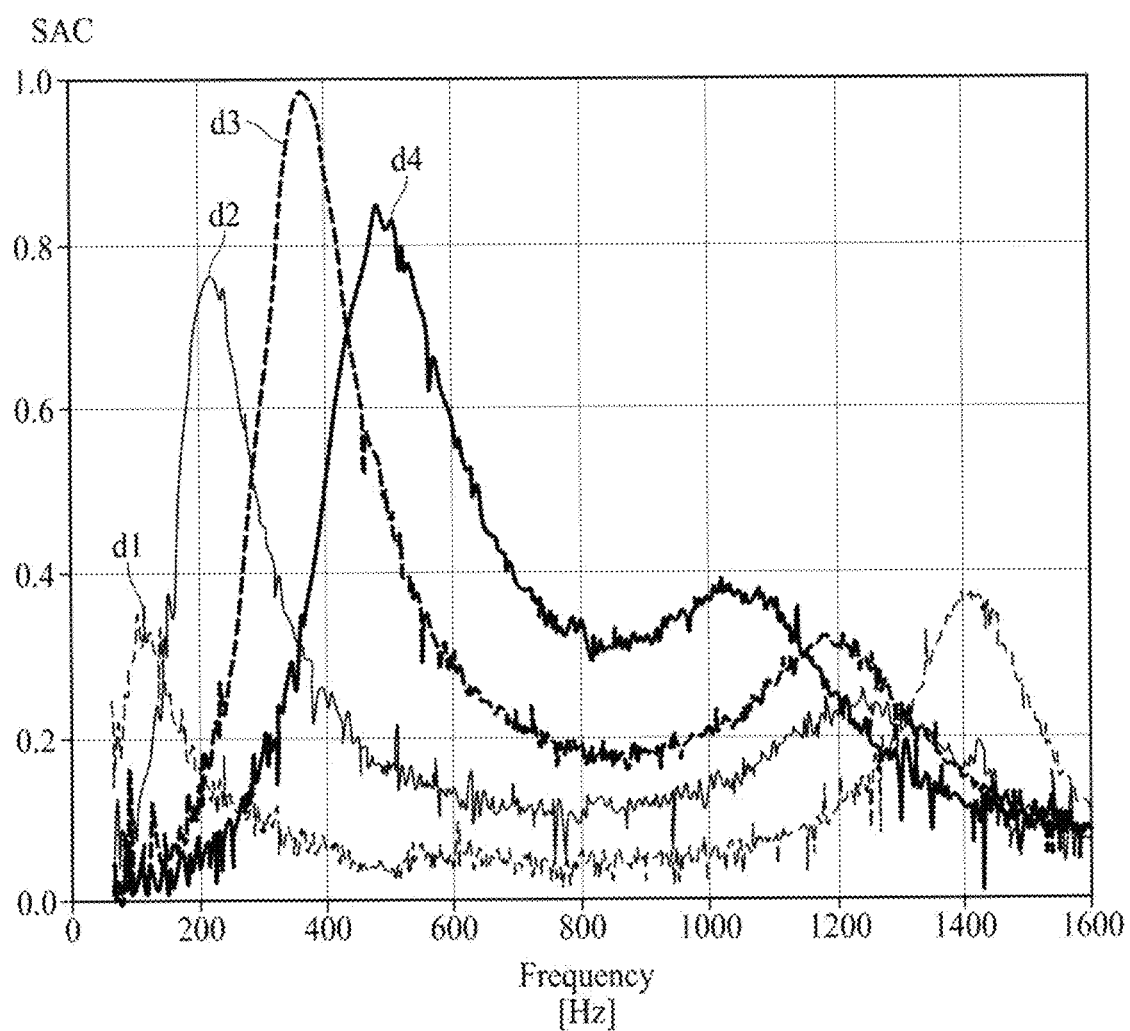
FIG. 10 is a graph of a sound absorption coefficient of a sound absorption member in the display apparatus of FIG. 8.

FIG. 10 is a graph of the SAC of the sound absorption member in the display apparatus of FIG. 8. In FIG. 10, the abscissa axis represents a frequency (Hz), and the ordinate axis represents a SAC.

With reference to FIG. 10, the sound absorption member 800 may adjust the diameter 'd' of the hole of the plate 810 to absorb a sound having a specific frequency and is not limited to the following example.

For example, in a case (d1) where the diameter 'd' of the hole of the plate 810 is 0 mm (or in a case where the plate 810 does not include a hole), the sound absorption member 800 may mainly absorb sound of about 100 Hz and about sound of 1,400 Hz. Therefore, the display apparatus according to an embodiment of the present disclosure may include the plate 810 without a hole, for absorbing sound of about 100 Hz or a sound of 1,400 Hz.

As another example, in a case (d2) where the diameter of the hole of the plate 810 is 1 mm, the sound absorption member 800 may mainly absorb a sound of 220 Hz. Therefore, the display apparatus according to an embodiment of the present disclosure may include the plate 810 including a hole having a diameter of 1 mm, for absorbing sound of about 220 Hz. Also, the SAC may increase more in a case where the diameter 'd' of the hole of the plate 810 is 1 mm, than a case where the plate 810 does not include a hole.

As another example, in a case (d3) where the diameter 'd' of the hole of the plate 810 is 1.5 mm, the sound absorption member 800 may mainly absorb sound of about 370 Hz. Therefore, the display apparatus according to the present disclosure may include the plate 810 including a hole having a diameter of 1.5 mm, for absorbing sound of about 370 Hz. Also, the SAC may increase more in a case where the diameter 'd' of the hole of the plate 810 is 1.5 mm, than a case where the diameter 'd' of the hole of the plate 810 is 1 mm.

As another example, in a case (d4) where the diameter 'd' of the hole of the plate 810 is 2 mm, the sound absorption member 800 may mainly absorb a sound of 480 Hz. Therefore, the display apparatus according to the present disclosure may include the plate 810 including a hole having a diameter of 2 mm, for absorbing a sound of about 480 Hz.

Therefore, the display apparatus according to the present disclosure may adjust the diameter 'd' of each of the plurality of holes of the plate 810 or the thickness 't' of the plate 810, and thus, may control a sound pressure level of a specific frequency domain.

Figure 11:
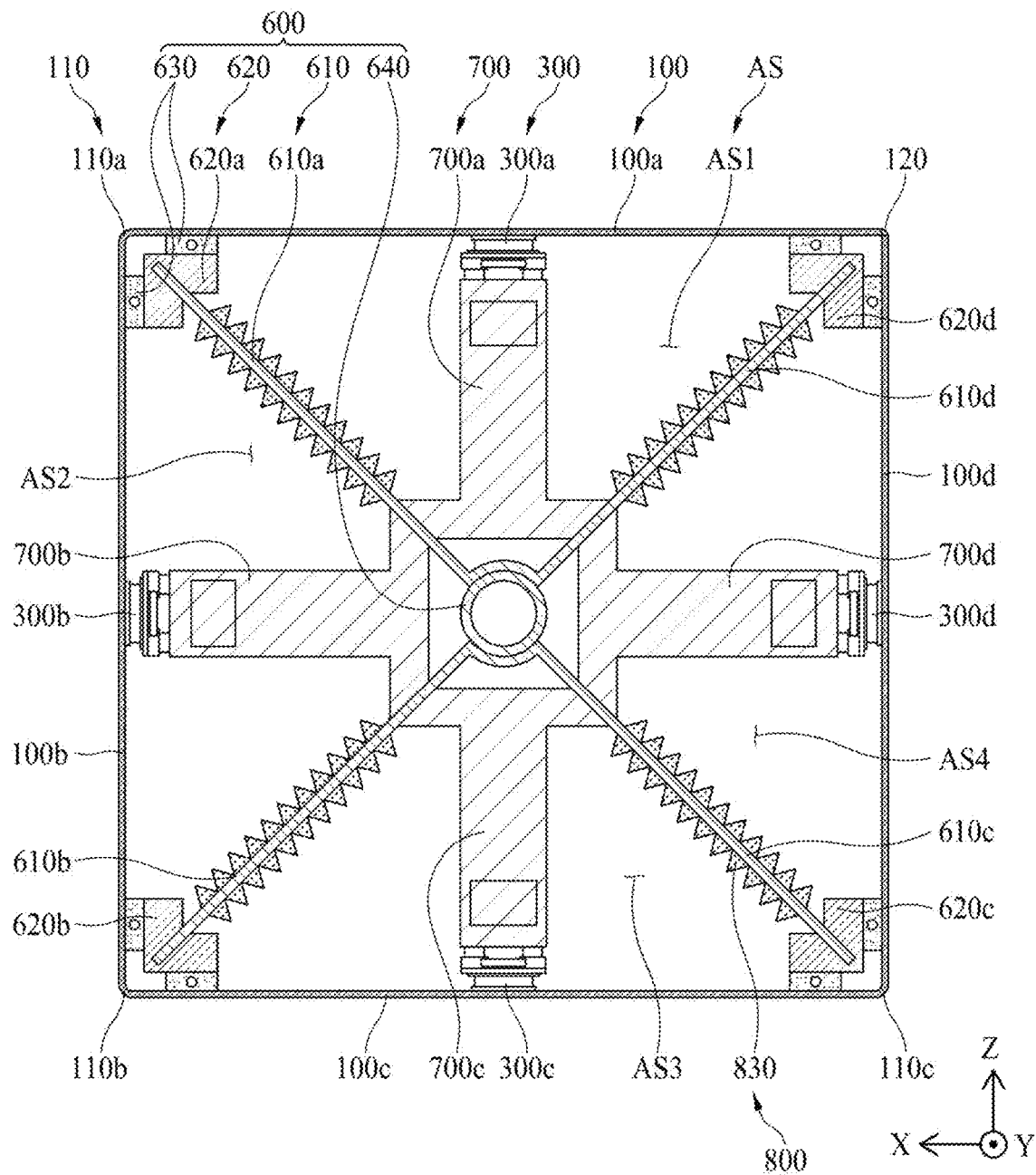
FIG. 11 is a plan view of a display apparatus further including a sound absorption member according to another embodiment of the present disclosure.
Figure 12:
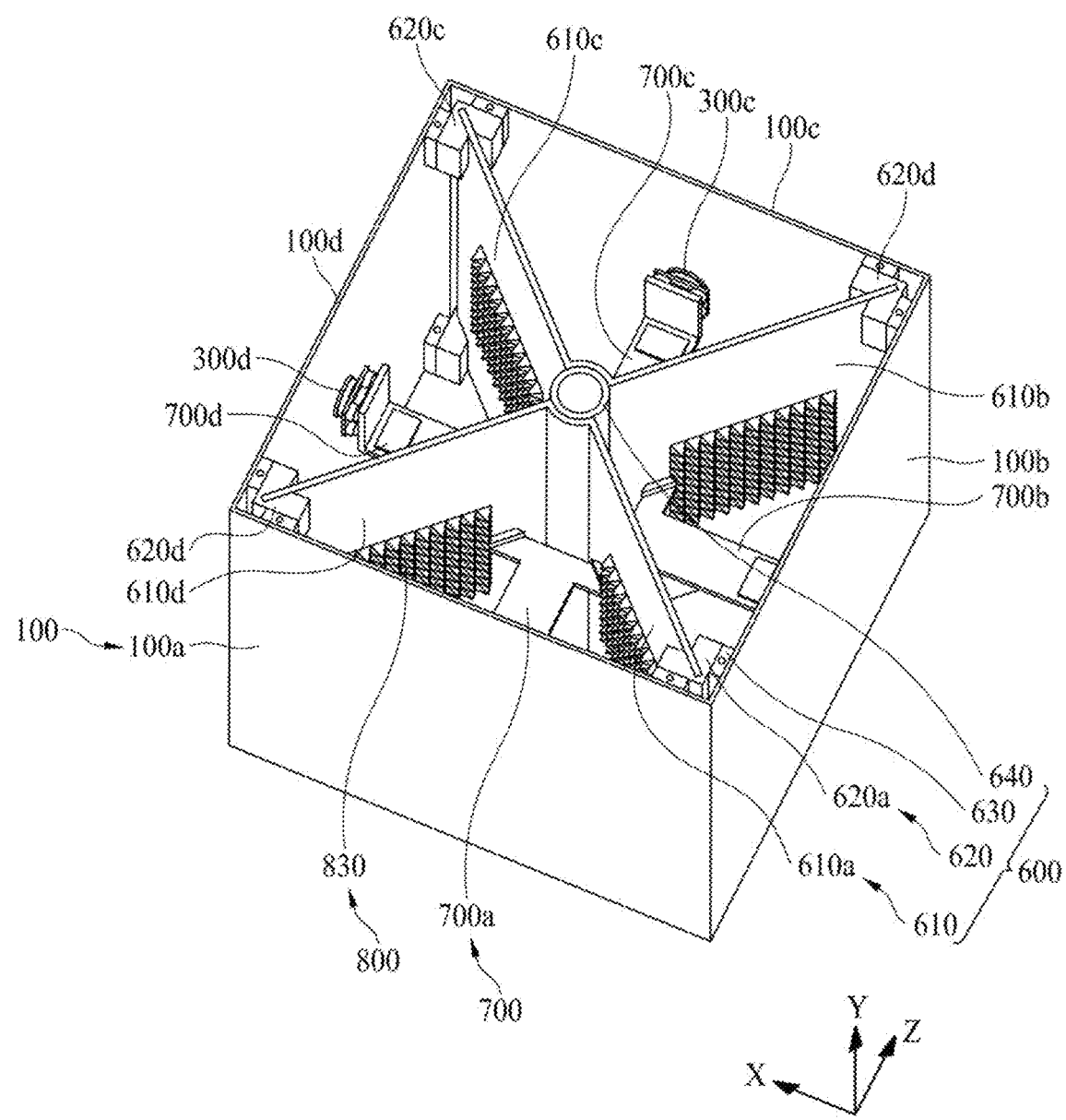
FIG. 12 is an internal perspective view of the display apparatus of FIG. 11.

FIG. 11 is a plan view of a display apparatus further including a sound absorption member according to another embodiment of the present disclosure. FIG. 12 is an internal perspective view of the display apparatus of FIG. 11.

With reference to FIGS. 11 and 12, the display apparatus may further include a sound absorption member 800 which is disposed on at least one surface of each of a plurality of partition walls 610 and controls a specific frequency of a sound generated by each of a plurality of vibration generating devices 300. For example, the sound absorption member 800 may be disposed on one surface of a first partition wall 610a facing a first air space AS1 and one surface of a fourth partition wall 610d facing the first air space AS1, and may control a specific frequency of a sound generated by a first vibration generating device 300a. Also, the sound absorption member 800 may be disposed on one surface of the first partition wall 610a facing a second air space AS2 and one surface of a second partition wall 610b facing the second air space AS2, and may control a specific frequency of a sound generated by a second vibration generating device 300b.

According to an embodiment of the present disclosure, the sound absorption member 800 may include a structure 830, which is disposed on at least one surface of each of the plurality of partition walls 610. For example, the structure 830 may include a protrusion pattern. Here, a bottom area and a height of the structure 830 may vary based on the required amount of sound absorption and may be set.

According to an embodiment of the present disclosure, the structure 830 may absorb a specific frequency of a sound generated by the vibration generating device 300. For example, a sound wave that is generated when a display panel 100 vibrates according to the vibration generating devices 300 may radially spread in an air space AS. When the sound wave of the air space AS reaches the structure 830, the sound wave may travel, and at this time, may be reflected between structure parts of the structure 830. Accordingly, the sound wave output from the structure 830 may be reduced in sound pressure level having a specific frequency. Here, the specific frequency where the sound pressure level decreases may be determined based on the bottom area and height of the structure 830, an interval between the structure parts of the structure 830, and a shape of the structure 830.

Therefore, the display apparatus according to an embodiment of the present disclosure may include the structure 830 disposed on at least one surface of each of the plurality of partition walls 610, and thus, may control a sound pressure level of a specific frequency domain and may absorb an undesired frequency domain. It is to be noted that although the structure 830 is illustrated as a protrusion pattern in FIGS. 11 to 12, but embodiments of the present disclosure is not limited thereto. For example, the structure 830 may be any other type of structure that is possible to control a sound pressure level of a specific frequency domain and to absorb an undesired frequency domain.

In addition, FIGS. 1-12 illustrate embodiments of a display apparatus having a display panel formed by four display surfaces, but the present disclosure is not limited thereto. For example, the display panel of the display apparatus may be formed by three display surfaces, or five or more display surfaces, such that the resulted closed-loop structure may be a triangle shape, a polygon shape, etc. That is, the number of the display surfaces and the structure of the vibration support is not limited to those shown in the Figures of the present disclosure.

A display panel applied to the display apparatus according to an embodiment of the present disclosure may be one of any type of display panel, such as an LCD panel, an organic light emitting diode display panel, a quantum dot light emitting display panel, and an electroluminescent display panel, but is not limited to a specific display panel. For example, the display panel according to an embodiment of the present disclosure may use any display panel that is vibrated by the sound generating device to generate sound. Also, the display apparatus according to an embodiment of the present disclosure may include a display panel including an organic light emitting layer, a quantum dot light emitting layer, and/or a micro light emitting diode.

Moreover, the vibration generating device according to an embodiment of the present disclosure may be applied to various display apparatuses. The display apparatus according to an embodiment of the present disclosure may include mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs),electronic organizers, desktop personal computers (PCs), laptop PCs, netbook computers, workstations, navigation apparatuses, automotive navigation apparatuses, automotive display apparatuses, televisions (TVs), notebook computers, monitors, cameras, camcorders, home appliances, etc.

A display apparatus according to an embodiment of the present disclosure will be described below.

According to an embodiment of the present disclosure, a display apparatus includes a display panel including a plurality of display surfaces having a closed-loop structure and configured to display images in different directions; a plurality of vibration generating devices configured to vibrate the plurality of display surfaces; and a vibration support surrounded by the plurality of display surfaces and configured to support the plurality of vibration generating devices.

In the display apparatus according to an example embodiment of the present disclosure, the vibration support includes a supporting frame including a plurality of bars; and a plurality of connection brackets respectively connecting the plurality of bars to the plurality of vibration generating devices.

In the display apparatus according to an example embodiment of the present disclosure, adjacent bars of the plurality of bars are connected to each other; and a vibration transferred to one of the plurality of bars is dispersed to the other of the plurality of bars.

In the display apparatus according to an example embodiment of the present disclosure, adjacent bars of the plurality of bars are extended in different directions.

In the display apparatus according to an example embodiment of the present disclosure, each of the plurality of connection brackets is configured to transfer heat from each of the plurality of vibration generating devices to the supporting frame.

In the display apparatus according to an example embodiment of the present disclosure, the display apparatus further includes a panel support surrounded by the plurality of display surfaces to support the plurality of display surfaces.

In the display apparatus according to an example embodiment of the present disclosure, the panel support includes a plurality of reinforcement frames configured to support the plurality of display surfaces; and a plurality of connection frames connecting adjacent reinforcement frames among the plurality of reinforcement frames.

In the display apparatus according to an example embodiment of the present disclosure, each of the plurality of connection frames is on a rear surface of the display panel through a connection member.

In the display apparatus according to an example embodiment of the present disclosure, each of the plurality of reinforcement frames overlaps a periphery of each of the plurality of display surfaces.

In the display apparatus according to an example embodiment of the present disclosure, each of the plurality of connection frames is at a corner of the closed-loop structure of the plurality of display surfaces.

In the display apparatus according to an example embodiment of the present disclosure, each of the plurality of connection frames is fixed to two adjacent display surfaces among the plurality of display surfaces through a connection member.

In the display apparatus according to an example embodiment of the present disclosure, the display panel further includes a plurality of bending portions connecting the plurality of display surfaces to each other.

According to an embodiment of the present disclosure, a display apparatus includes a display panel including a plurality of display surfaces configured to display images in different directions; a separation part configured to separate spaces respectively corresponding to the plurality of display surfaces; a plurality of vibration generating devices respectively configured to vibrate the plurality of display surfaces; and a plurality of vibration supports between each of the plurality of vibration generating devices and the separation part and configured to support the plurality of vibration generating devices.

In the display apparatus according to an example embodiment of the present disclosure, the separation part includes a plurality of partition walls configured to separate the spaces respectively corresponding to adjacent display surfaces of the plurality of display surfaces; and a plurality of supports between each of the plurality of partition walls and a corner of the plurality of display surfaces.

In the display apparatus according to an example embodiment of the present disclosure, the separation part further comprises a connection member configured to connect each of the plurality of supports to a rear surface of the display panel; and a center shaft configured to support the plurality of partition walls.

In the display apparatus according to an example embodiment of the present disclosure, the plurality of display surfaces have a closed-loop structure; and each of the plurality of partition walls extends from a center of the closed-loop structure to a respective corner of the closed-loop structure, and is configured to support the plurality of display surfaces.

In the display apparatus according to an example embodiment of the present disclosure, each of the plurality of supports is at a respective corner of the plurality of display surfaces, and is configured to support the plurality of display surfaces.

In the display apparatus according to an example embodiment of the present disclosure, the plurality of vibration generating devices is symmetrical with respect to the separation part.

In the display apparatus according to an example embodiment of the present disclosure, each of the plurality of vibration supports is between adjacent partition walls of the plurality of partition walls.

In the display apparatus according to an example embodiment of the present disclosure, each of the plurality of vibration supports is configured to transfer heat from each of the plurality of vibration generating devices to adjacent partition walls of the plurality of partition walls.

In the display apparatus according to an example embodiment of the present disclosure, each of the plurality of vibration supports extends in a direction perpendicular to a corresponding display surface; and each of the plurality of partition walls extends in a diagonal direction with respect to the extension direction of each of the plurality of vibration supports.

In the display apparatus according to an example embodiment of the present disclosure, the display apparatus further includes a sound absorption member on at least one surface of each of the plurality of partition walls.

In the display apparatus according to an example embodiment of the present disclosure, the sound absorption member includes a plate spaced apart from at least one surface of each of the plurality of partition walls, the plate including a plurality of holes; and an absorption pad on one surface of the plate and facing the plurality of partition walls.

In the display apparatus according to an example embodiment of the present disclosure, a diameter of each of the plurality of holes is based on a specific frequency of a sound to be controlled by the sound absorption member.

In the display apparatus according to an example embodiment of the present disclosure, the sound absorption member comprises a structure on at least one surface of each of the plurality of partition walls.

In the display apparatus according to an example embodiment of the present disclosure, the structure includes a protrusion pattern.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display apparatus, comprising:
a display panel including a plurality of display surfaces having a closed-loop structure, the display panel being configured to display images in different directions;
a plurality of vibration generating devices configured to vibrate the plurality of display surfaces; and
a vibration support surrounded by the plurality of display surfaces, the vibration support being configured to support the plurality of vibration generating devices,
wherein the vibration support comprises:
a supporting frame including a plurality of bars, and
a plurality of connection brackets respectively connecting the plurality of bars to the plurality of vibration generating devices,
wherein the supporting frame is spaced apart from the plurality of vibration generating devices,
wherein the plurality of connection brackets protrude from the supporting frame,
wherein the plurality of connection brackets comprise a first part and a second part bent vertically from the first part,
wherein the first part contacts the plurality of vibration generating devices, and
wherein the second part contacts the supporting frame.

2. The display apparatus of claim 1, wherein:
adjacent bars of the plurality of bars are connected to each other; and
a vibration transferred to one of the plurality of bars is dispersed to the other of the plurality of bars.

3. The display apparatus of claim 2, wherein adjacent bars of the plurality of bars are extended in different directions.

4. The display apparatus of claim 1, wherein each of the plurality of connection brackets is configured to transfer heat from each of the plurality of vibration generating devices to the supporting frame.

5. The display apparatus of claim 1, further comprising a panel support surrounded by the plurality of display surfaces to support the plurality of display surfaces.

6. The display apparatus of claim 5, wherein the panel support comprises:
a plurality of reinforcement frames configured to support the plurality of display surfaces; and
a plurality of connection frames connecting adjacent reinforcement frames among the plurality of reinforcement frames.

7. The display apparatus of claim 6, wherein each of the plurality of connection frames is on a rear surface of the display panel through a connection member.

8. The display apparatus of claim 6, wherein each of the plurality of reinforcement frames overlaps a periphery of each of the plurality of display surfaces.

9. The display apparatus of claim 6, wherein each of the plurality of connection frames is at a corner of the closed-loop structure of the plurality of display surfaces.

10. The display apparatus of claim 6, wherein each of the plurality of connection frames is fixed to two adjacent display surfaces among the plurality of display surfaces through a connection member.

11. The display apparatus of claim 1, wherein the display panel further includes a plurality of bending portions connecting the plurality of display surfaces to each other.

12. The display apparatus of claim 1, wherein the plurality of vibration generating devices are configured to vibrate the plurality of display surfaces to output sound toward a forward region, a left region, a rearward region, and a right region, with respect to the display panel.

13. The display apparatus of claim 1, wherein the supporting frame includes the closed-loop structure where the plurality of bars are provided as one body.

14. The display apparatus of claim 1, wherein the plurality of bars are configured to support the plurality of vibration generating devices.

15. The display apparatus of claim 1, wherein:
the plurality of bars includes a first bar, a second bar, a third bar, and a fourth bar; and
each of the first to fourth bars is bent vertically from the bar adjacent to the respective bar.

16. The display apparatus of claim 1, wherein:
the plurality of bars includes a first bar, a second bar, a third bar, and a fourth bar;

the first bar is bent vertically from the second bar and the fourth bar; and the second bar is bent vertically from the first bar and the third bar.

17. The display apparatus of claim 6, wherein each of the plurality of reinforcement frames is on a rear surface of the display panel by a connection member.

18. The display apparatus of claim 6, wherein the display panel further comprises:

a plurality of bending portions between the plurality of display surfaces; and a connection portion connecting the plurality of display surfaces to each other.

19. The display apparatus of claim 18, wherein the plurality of connection frames are disposed adjacent to the plurality of bending portions and the connection portion.

20. The display apparatus of claim 1, wherein:

the second part comprises a component in contact with one of the plurality of bars of the supporting frame;

the one of the plurality of bars has a first width and a first length, the first length being longer than the first width;

the component has a second width and a second length, the second length being longer than the second width; and an axis of the first length is perpendicular to an axis of the second length.

* * * * *